(12) United States Patent
Chike et al.

(10) Patent No.: US 10,272,585 B1
(45) Date of Patent: Apr. 30, 2019

(54) TISSUE LOG SAW CONVEYOR WITH INDEPENDENT LANE CONTROL CUTTING AND VARIABLE CONVEYOR FLIGHT LENGTH

(71) Applicant: Paper Converting Machine Company, Green Bay, WI (US)

(72) Inventors: Matthew J. Chike, Luxemburg, WI (US); Cory P. Gussert, Pulaski, WI (US)

(73) Assignee: PAPER CONVERTING MACHINE COMPANY, Green Bay, WI (US)

( * ) Notice: Subject to any disclaimer, the term of this patent is extended or adjusted under 35 U.S.C. 154(b) by 0 days.

(21) Appl. No.: 15/919,424

(22) Filed: Mar. 13, 2018

Related U.S. Application Data

(60) Provisional application No. 62/570,881, filed on Oct. 11, 2017.

(51) Int. Cl.
*B26D 3/16* (2006.01)
*B26D 7/01* (2006.01)
*B26D 7/06* (2006.01)
*B65G 19/02* (2006.01)
*B65G 19/22* (2006.01)
*B65G 47/31* (2006.01)

(52) U.S. Cl.
CPC .............. *B26D 7/0625* (2013.01); *B26D 3/16* (2013.01); *B26D 7/01* (2013.01); *B65G 19/02* (2013.01); *B65G 19/225* (2013.01); *B65G 47/31* (2013.01); *B26D 2007/013* (2013.01)

(58) Field of Classification Search
CPC .......... B26D 7/0625; B62D 3/16; B62D 7/01; B62D 2007/013; B65G 19/02; B65G 19/185; B65G 19/205; B65G 19/225; B65G 19/245; B65G 19/265; B65G 47/31
USPC ........................................ 198/419.3
See application file for complete search history.

(56) References Cited

U.S. PATENT DOCUMENTS 4,265,361 A * 5/1981 Schroeder ................ B26D 3/16
198/626.1
4,552,261 A * 11/1985 Raudat ..................... B65B 21/06
198/419.3
5,127,209 A * 7/1992 Hunter ...................... B65B 35/44
198/419.3

(Continued)

OTHER PUBLICATIONS

International Search Report and Written Opinion for PCT/US2018/022914 dated Jul. 20, 2018.

*Primary Examiner* — Mark A Deuble
(74) *Attorney, Agent, or Firm* — Thompson Coburn LLP (57) ABSTRACT

A conveyor system for advancing tissue logs has a first log advancement member that conveys a lead tissue log toward a discharge end of a lane via a first drive, and a second log advancement member that conveys a successive tissue log after the lead tissue log toward the discharge end of the lane via a second drive. A controller is coupled to the first and second drives. The controller is adapted and configured to control: the first drive to move the first log advancement member between a start and finish position, the second drive to move the second log advancement member between the start and finish position, and the first drive independently of the second drive. A plurality of like lanes may be provided and the controller may also control the first and second drives of one lane independently of the first and second drives of another lane.

19 Claims, 10 Drawing Sheets

(56) References Cited

U.S. PATENT DOCUMENTS

| | | | |
|---|---|---|---|
| 5,458,033 A * | 10/1995 | Wierschke | B26D 3/16 |
| | | | 198/471.1 |
| 5,657,615 A * | 8/1997 | Muller | B65G 17/123 |
| | | | 198/419.3 |
| 5,893,701 A * | 4/1999 | Pruett | B65B 23/14 |
| | | | 198/419.1 |
| 6,532,851 B2 | 3/2003 | Moss et al. | |
| 9,309,015 B2 * | 4/2016 | Overley | B65B 35/30 |
| 2006/0126522 A1 * | 6/2006 | Oh | H04L 63/1416 |
| | | | 370/250 |
| 2009/0038458 A1 * | 2/2009 | Ridolfi | B26D 3/161 |
| | | | 83/471.2 |
| 2009/0120256 A1 | 5/2009 | Pasek | |
| 2012/0297944 A1 | 11/2012 | Maddaleni et al. | |
| 2014/0110228 A1 * | 4/2014 | Franzaroli | B65G 15/44 |
| | | | 198/836.3 |
| 2015/0136564 A1 | 5/2015 | Hurni et al. | |
| 2015/0298331 A1 | 10/2015 | Diehr et al. | |
| 2017/0320671 A1 * | 11/2017 | Rasi | B65B 25/146 |
| 2018/0162005 A1 | 6/2018 | Kettula et al. | |
| 2018/0162006 A1 | 6/2018 | Kettula et al. | |

\* cited by examiner

TISSUE LOG SAW CONVEYOR WITH INDEPENDENT LANE CONTROL CUTTING AND VARIABLE CONVEYOR FLIGHT LENGTH

CROSS-REFERENCE TO RELATED APPLICATION

The present application is a non-provisional application claiming the benefit of U.S. Provisional App. Ser. No. 62/570,881, filed Oct. 11, 2017, which is incorporated herein by reference in its entirety.

BACKGROUND

The disclosure is directed to a conveyor for conveying tissue logs to a saw. The conveyor may have multiple lanes for conveying the tissue logs toward the log saw. The lanes may have log advancement members operatively connected to drives that are controlled by a controller. The controller may be configured to control the drives and move the log advancement members to advance the logs toward the log saw for cutting independently of one another. In one embodiment as described in more detail below, the conveyor has 4 lanes, and the log saw has a saw head with a rotary blade mounted on a cutting arm that orbits relative to the lanes. The tissue log placed in each lane is able to move independently relative to the adjacent lane. For example, lane 1 may move independently from lane 2, lane 2 may move independently from lane 3, lane 3 may move independently from lane 4, and lane 4 may move independently from lane 1. Additionally, successive tissue logs placed in the same lane may be moved independently within the same lane.

DETAILED DESCRIPTION

Figure 1:
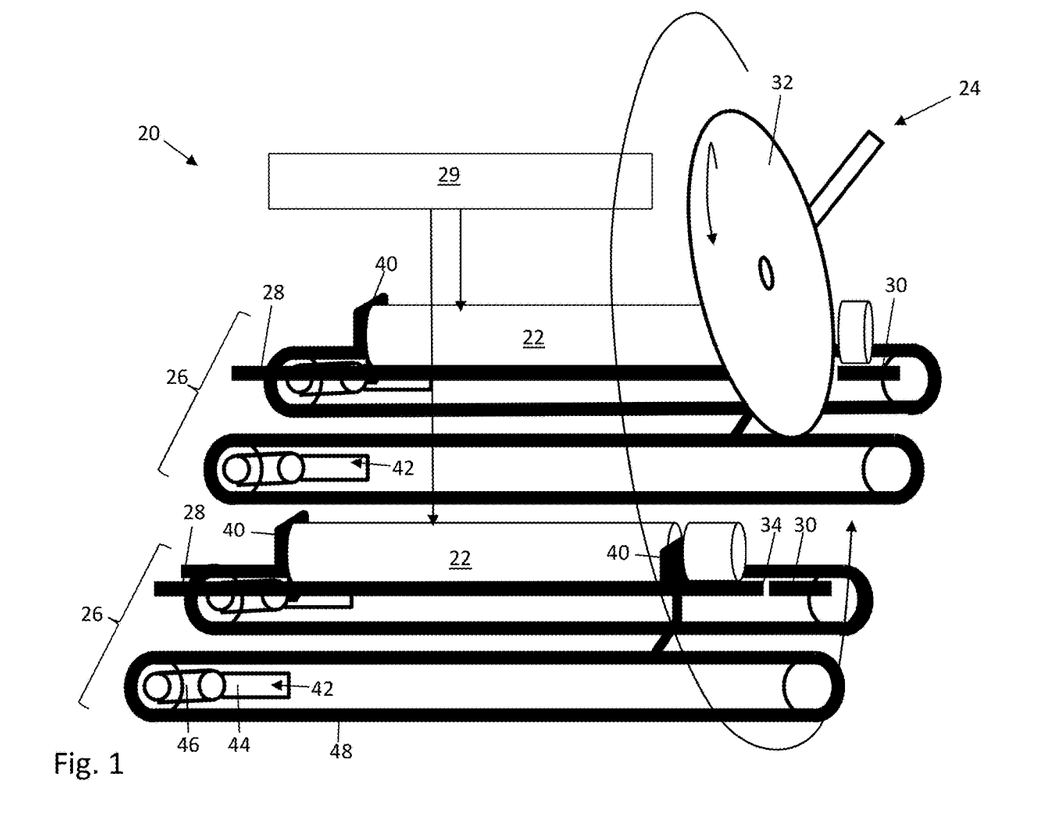
FIG. 1 is a schematic drawing of a two lane conveyor and tissue saw as described herein.

FIG. 1 shows a conveyor system 20 for advancing tissue logs 22, for instance, for cutting in a log saw 24. The conveyor system 20 may include one lane 26 or have a plurality of lanes extending side by side. The lanes 26 may comprise a trough-like structure dimensioned to support the bottom and side surfaces of the tissue log 22 to be processed with an open top to allow the log to be deposited or received in the lane. The lane 26 may have a receiving end 28 and an opposite discharge end 30 and a length extending between the receiving end and the discharge end. The lane 26 may be configured to receive a tissue log 22 in the lane at the receiving end 28 of the lane. For instance, each lane may be configured to receive a tissue log from an accumulator 29 associated with a tissue winding machine. The accumulator 29 may be configured to release a number of logs into the available lanes of the conveyor. The lane 26 may be configured to discharge the tissue log 22 from the discharge end 30 of the lane. The discharge end 30 of the lane may be configured to expose tissue logs in the lane to a blade 32 of the log saw 24. For instance, a gap 34 may be provided in lane adjacent to the discharge end 30 of the lane to allow the blade 32 of the log saw 24 to pass therethrough. The length of the lane may extend in a direction perpendicular to the cutting plane of the log saw. The lanes 26 may extend from a position to receive the tissue logs from the accumulator to a position beyond the log saw 24 so as to allow portions of the tissue log cut by the saw to be directed to a discharge conveyor for further processing. In the alternative, one lane may be provided. While the drawings show a log saw integrated with the conveyor system, the conveyor system may be stand-alone equipment that may be retrofitted or integrated with existing saw equipment.

To assist in advancing the tissue logs toward the saw for cutting, each lane 26 may be provided with at least one log advancement member 40. The log advancement member 40 may comprise a paddle-like pusher configured to engage an axial end of the tissue log 22 at the receiving end 28 of the lane and push the tissue log toward the discharge end 30 of the lane and the log saw 24 with the axially opposite end of the tissue log passing through the path of the blade 32 of the log saw first. The log advancement member 40 may move between a starting position in which the log advancement member is positioned in the lane so as to allow the tissue log 22 to be received in the lane at the receiving end 28 of the lane from the upstream processing source, for instance, an accumulator, and a finish position in which the log advancement member advances the tissue log to the discharge end 30 of the lane and past the path of travel of the blade 32 of the log saw 24 across the lane, as applicable, so as to allow the last segment of the tissue log to be cut. In the alternative or in addition to, the log advancement member 40 may engage the outer cylindrical surface of the tissue log in advancing the tissue log toward the saw. As will be described in more detail below, the log advancement member may advance the log in coordination with the travel of the blade.

A drive 42 may be provided to move the log advancement member between the starting and finish position. One or more log advancement members 40 may be associated with a drive. For instance, in the embodiment shown in the drawings, the drive 42 may comprise a motor 44 and transmission 46 for rotating a continuous loop 48 on which one log advancement member 40 is connected. The drive may also comprise a motor and transmission for rotating a continuous loop on which two or more log advancement members are connected. The drive motor 44 may be a servo motor, and the transmission 46 may include a drive belt and a sprocket or wheel for driving the continuous loop 48 on which the log advancement member 40 is connected. A servo motor such as an Allen Bradley™ VPL series servo motor may be used. The continuous loop 48 may be a belt or a chain. Each lane 26 may be provided with two or more continuous loops 48 and two or more corresponding drives 42 with at least one log advancement member 40 fixed in position on each of the continuous loops. Thus, each lane may have at least two log advancement members, that is, at least a first log advancement member associated with the first continuous loop and drive of the lane, and at least a second log advancement member associated with the second continuous loop and drive of the lane.

Figure 3:
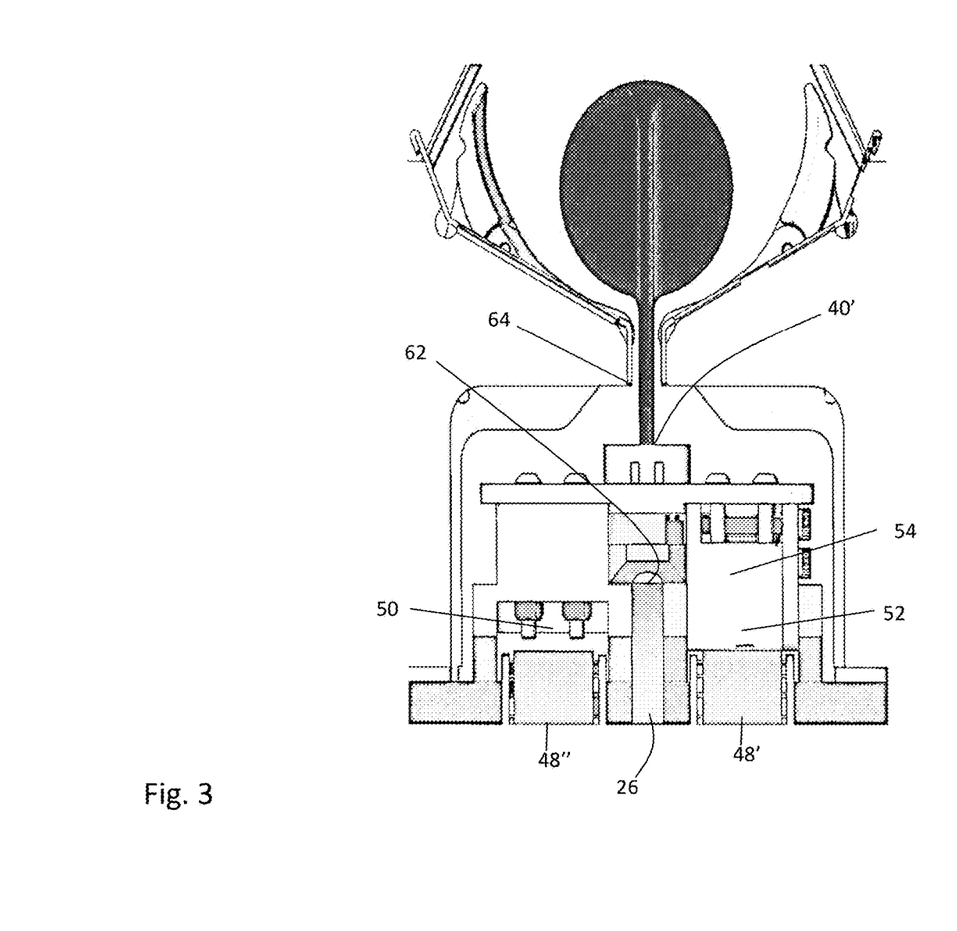
FIG. 3 is an end view of a lane of conveyor as described herein showing a log advancement member, a rail, and the continuous loops for the lane, and a portion of a peripheral constraint.
Figure 4:
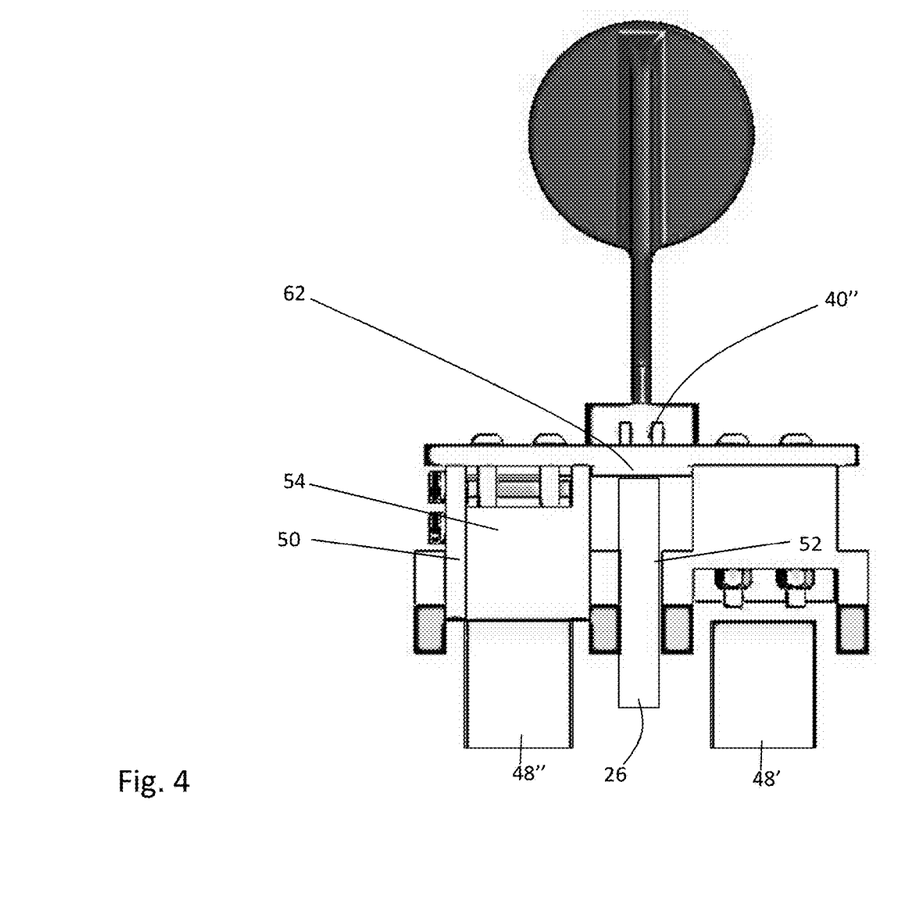
FIG. 4 is an end view of a lane of conveyor as described herein showing a log advancement member and the continuous loops for the lane.
Figure 5:
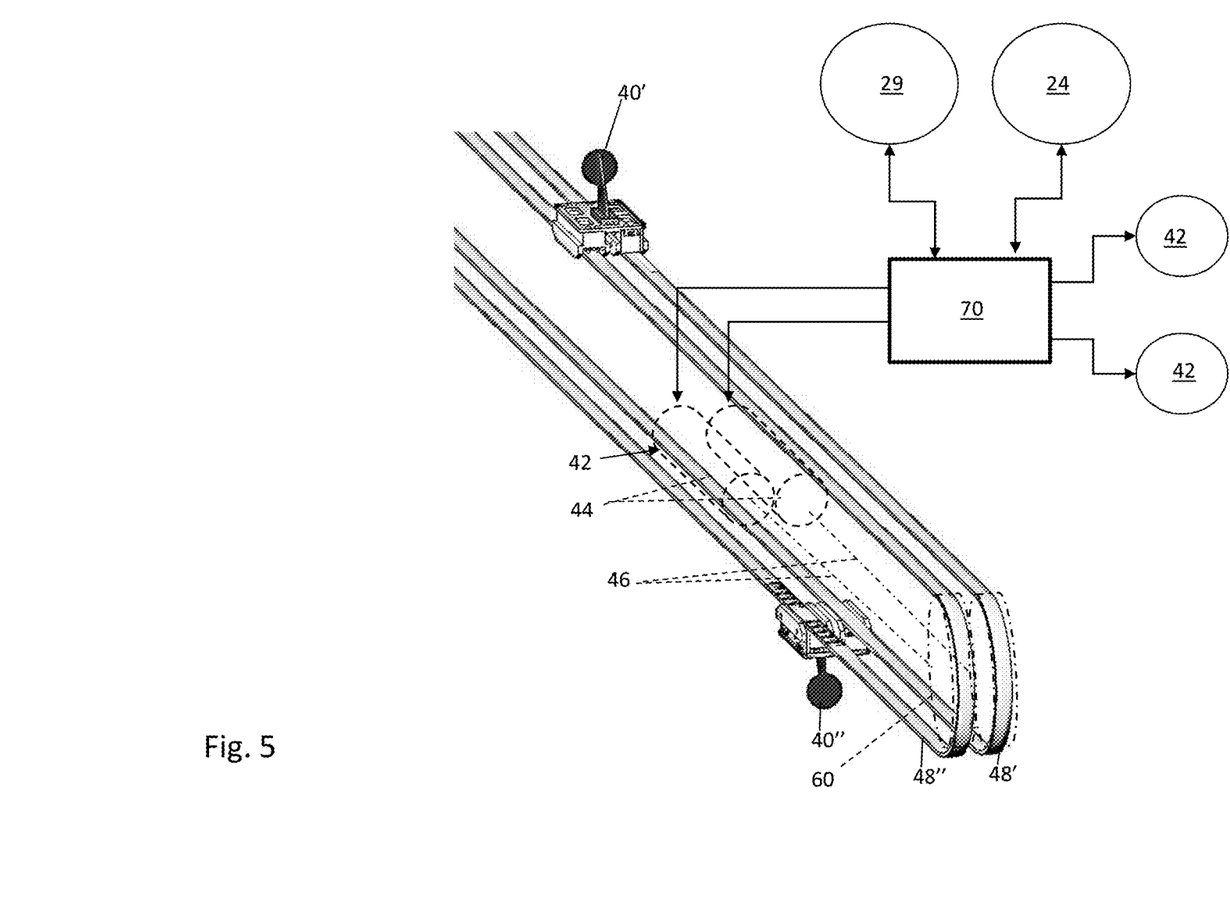
FIG. 5 is a partial, perspective view of the log advancement members and the continuous loops for the lane.

A log advancement member 40 may be connected to its continuous loop 48 in a manner to allow the other companion continuous loop to pass through its companion log advancement member in a given lane 26. The log advancement member 40 may include side-by-side guides 50,52 dimensioned to accommodate the width of each continuous loop. Referring to FIG. 3, the right side guide 52 of the right side log advancement member 40' may have a loop connector 54 disposed in the guide 52 to allow the right side log advancement member to be connected to the right side continuous loop 48'. A like loop connector may be omitted in the left side guide 50 to allow the left side continuous loop 48" to pass through the right side log advancement member. In a similar way, for instance, as shown in FIG. 4, the left side guide 50 of the left side log advancement member 40" may have a loop connector 54 disposed in the guide 50 to allow the left side log advancement member to be connected to the left side continuous loop 48". The loop connector may be omitted from the right side guide 52 to allow the right side continuous loop 48' to pass through the left side log advancement member 40". Thus, a standard log advancement member may be provided and fitted to either the left side continuous loop or the right side continuous loop by installing the loop connector in the desired guide as needed. By allowing a companion continuous loop to pass through a companion log advancement member, each loop and the log advancement member connected thereto can be independently controlled without affecting the companion log advancement member.

The drive 42 for each continuous loop 48 may be mounted below the structure of the lane 26. The drive sprocket or wheel 60 may be rotatably mounted at the end of the lane. The lane 26 may have a center rail 62 to support the log advancement member 40 as it travels in the lane. The continuous loops 48 may be arranged on either side of the center rail. The center axis of each log advancement member may be offset from its respective continuous loop so as to permit the log advancement member to travel in the center of the lane. The lane may have a channel 64 above the rail to accommodate the log advancement member as it travels in the lane.

A controller 70 may be coupled to each drive 42. The controller may comprise an Allen Bradley™ K5700 series servo drive. The controller 70 may be adapted and configured to control each drive 42 to initiate movement of the log advancement member 40 between the starting and finish positions. The controller 70 may be adapted and configured to control the drive 42 of the log advancement member 40 of one lane 26 independently of the log advancement member of another lane or to move the log advancement members of all of the lanes together simultaneously. The movement of the log advancement members 40 of the lanes 26 may be synchronized. The controller may also be adapted and configured to control the drive of the first log advancement member of each lane independently of the drive of the second log advancement member of each lane. To coordinate motion of the drives 42 and the log advancement members 40, as well as action of any accumulator 29 and log saw 24, the controller 70 may be configured to receive location signals from a position encoder on the drive 42, the continuous loop 48, or drive sprocket or wheel 60, or proximity sensors on the lane 26 relative to the location of the log advancement member 40, the status of the accumulator and the log saw. In response to the location signals, the controller 70 may be configured to control the drive to initiate movement of the log advancement member 40 as needed. For instance, once a tissue log 22 is received in the lane 26, for instance, from the accumulator 29, the controller may be configured to send a signal to the drive 42 to move the log advancement member 40 to the start position. Thereafter, the controller 70 may be configured to send signals to the drive 42 to intermittently advance the log advancement member 40 and the tissue log 22 toward the finish position. The signals may also be based upon positioning of the log saw 24 as the saw cycles through its cut. The signals may be a preprogrammed stepping or indexing of the log advancement member based on preselected parameters, including factors such as the saw cycle, tissue log segment length, tissue log size, number of active lanes, etc. The controller 70 may be configured to send signals to the drive 42 to rapidly move the log advancement member 40 to the starting position, once the log advancement member arrives at the finish position so as to be in position to advance the next or successive tissue log received in the lane. The controller 70 may be configured to send signals to the drive 42 to rapidly move the log advancement member 40 from the starting position to a position where a subsequent tissue log 22 received in the lane 26 is moved adjacent to a lead tissue log in the lane that is being advanced in the lane and/or cut with the saw.

The controller 70 may be configured to send signals to the drive 42 of the lead tissue log advancement member 40 to dwell the lead tissue log advancement member at the finish position after the lead tissue log has completed processing and is discharged from the discharge end 30 of the lane. The controller 70 may be configured to also send signals to the successive tissue log advancement member 40 to advance the second tissue log toward the lead tissue log advancement member so the successive tissue log is held in position against the lead tissue log advancement member and the successive tissue log advancement member. By dwelling the lead tissue log advancement member at the finish position, the lead tissue log advancement member may engage the successive tissue log in the lane and support the free end of the successive tissue log during its initial sizing or face cut with the blade 32 of the log saw 24, which may prevent a biased or skewed lead face on the successive tissue log. Once the sizing or facing cut is complete, the controller 70 may be configured to move the lead tissue log advancement member to the start position at the receiving end of the lane to engage another tissue log received in the lane. The controller may be configured to initiate movement of the other log advancement to move the log to the discharge for cutting with the blade of the log saw. Once in the finish position, the controller may be configured to dwell the other log advancement member in the same manner as described previously to support the successive tissue log in the lane for its initial sizing or facing cut. Accordingly, the log advancement members may be configured to support a tissue log in both directions in the lane, e.g., advancement toward the discharge end of the lane and backwards toward the receiving end of the lane during the dwell cycle.

Figure 2:
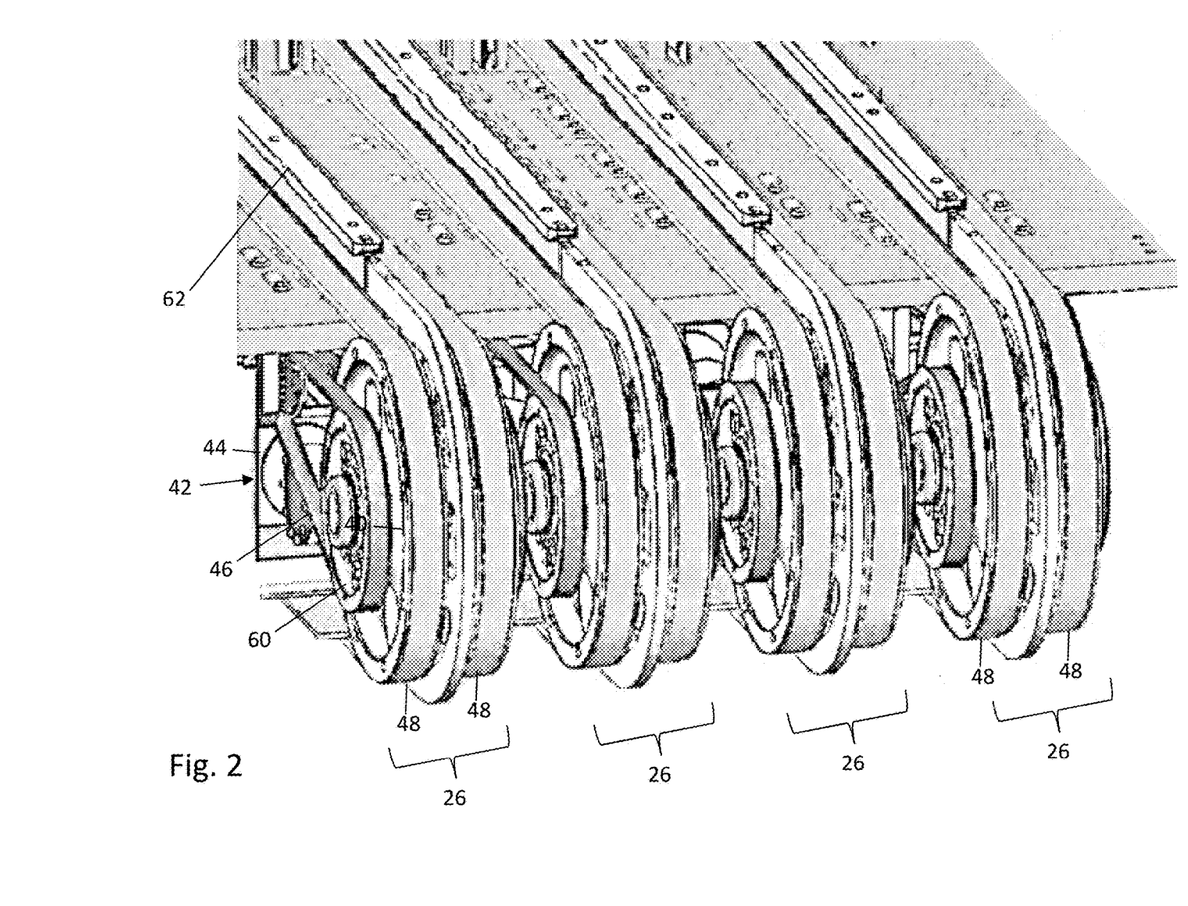
FIG. 2 is a partial perspective view of an end of a four lane conveyor as described herein.
Figure 6:
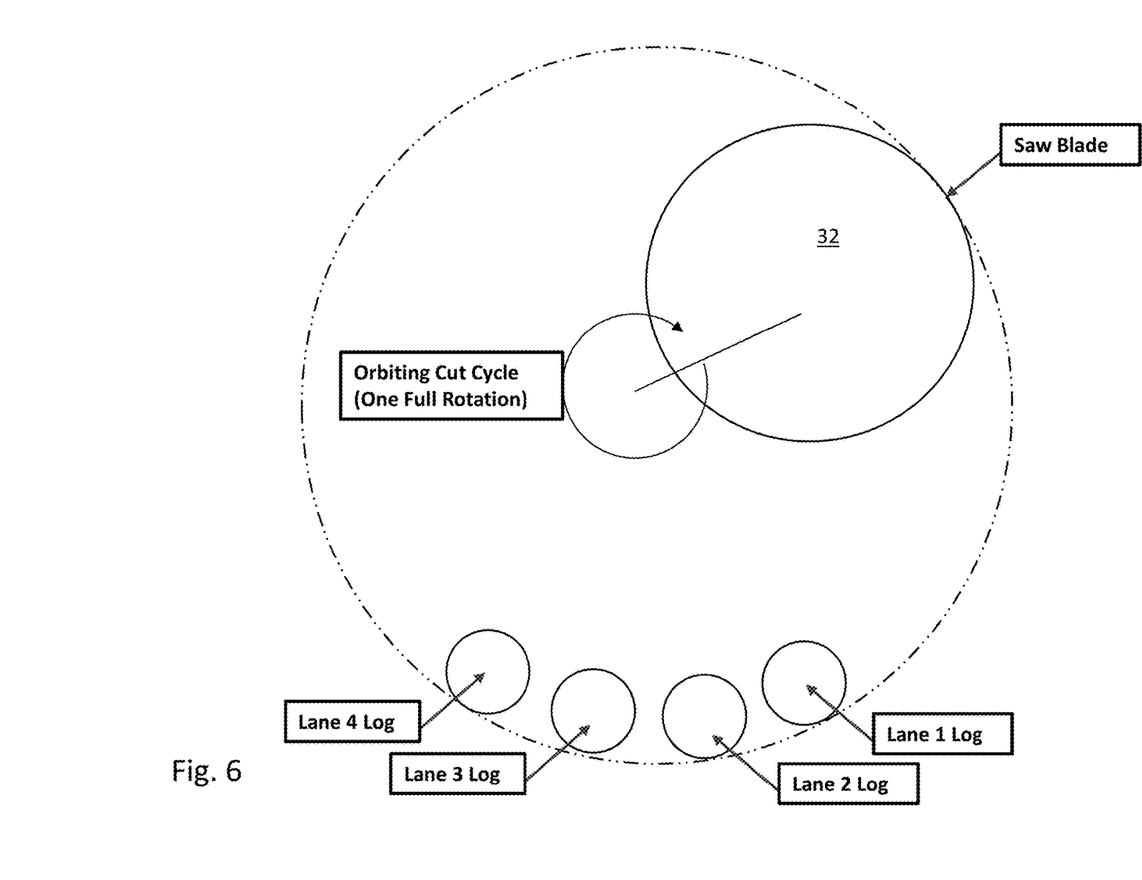
FIG. 6 is a schematic drawing of a four lane conveyor and the orbiting cut cycle of the saw blade.
Figure 7:
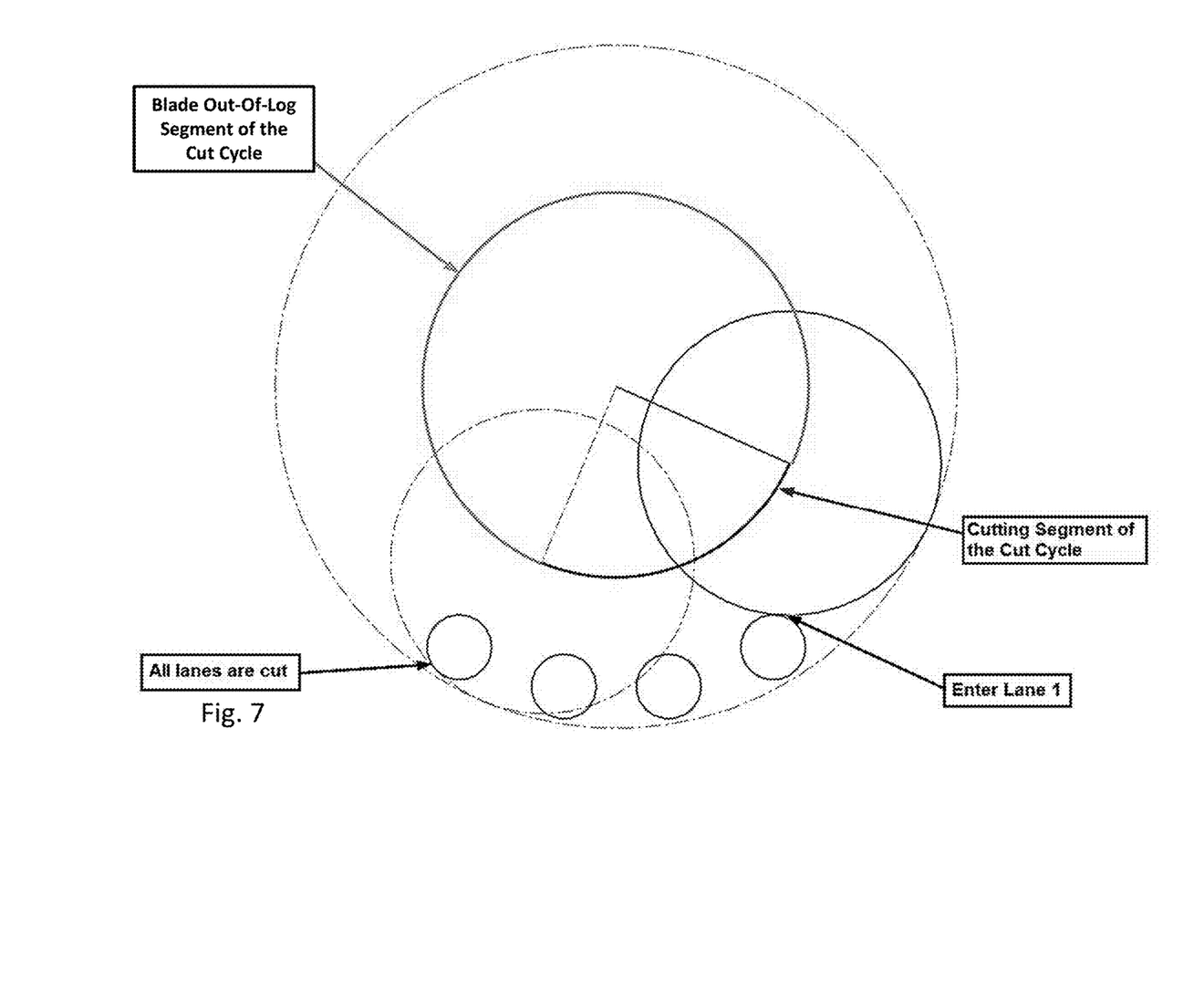
FIG. 7 is a schematic drawing of the saw cut cycle when the log advancement members of all four lanes move together.
Figure 8:
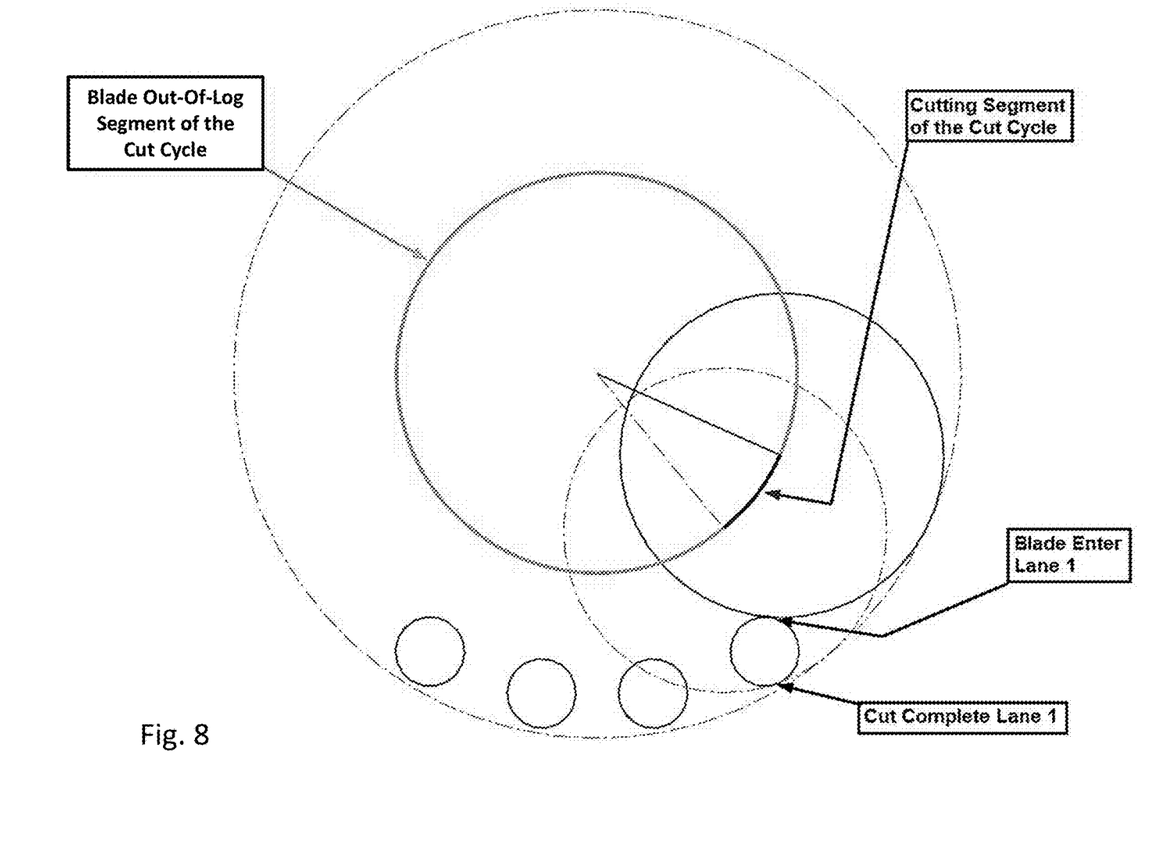
FIG. 8 is a schematic drawing of the saw cut cycle when the log advancement members of all four lanes move independent of one another.

The controller 70 may be enabled to control the drive in accordance with the saw 24 and saw cut cycle. FIGS. 6-8 provide schematic drawings of the cut cycle of an exemplary orbital saw 24 as it passes through a four lane conveyor, for instance, as shown in FIG. 2. When conveying the tissue logs through the saw to be cut, the log conveyor motion may be considered in two separate segments: (a) a "cutting" segment and (b) a "blade out-of-log" segment. In FIGS. 6-8, one saw cutting head is shown. The concept may be applied to a saw with 2 or more lanes or a saw with any number or type of cutting head(s). The saw may be an orbital cutting saw, a plunge cutting saw, a band saw or a reciprocal saw. The blade cutting segment describes the portion of the cut cycle when the saw blade enters the lane and cuts the log. The blade cutting segment may begin when the blade 32 enters the lane 26 and may end when the blade has completed the cut of the tissue log 22. Generally speaking, during the blade cutting segment of the conveyor motion, the log and blade travel at the same velocity in the direction of log travel. Otherwise, the cut that is made on the tissue log will have a skew or bias on the cut-off tissue log segment. In other words, if, for instance, the saw is an indexing saw and the cutting head orbits in a single plane (no movement in the log travel direction), the controller 70 must control the drive 42 to maintain the log advancement member 40 and thus the tissue log 22 stationary during the blade cutting segment of the conveyor motion. A saw cutting head that has a component of velocity in the direction of log travel would have to match the velocity of the conveyed log in order not to have skew or bias to the cut. During the blade cutting segment, depending on the application, the saw blade 32 may still be in the lane 26 after completing the cut of the log 22, and the controller may be configured to send signals to the drive 42 to advance the log advancement member, which may compress the log against the blade temporarily before the blade exits the lane. Alternatively, the blade cutting segment may begin when the blade 32 enters the lane 26 and end when the blade exits the lane. The blade out-of-log segment describes the portion of the cut cycle when the orbiting saw cutting blade 32 has completed cutting the log and moves to a position to begin cutting another log. The blade out-of-log segment may begin when the blade 32 has completed cutting the log 22 and may end when the blade enters the adjacent lane 26 to cut another log. Alternatively, the blade out-of-log segment may begin when the blade 32 has exited the lane 26 and may end when the blade enters the lane to cut another log. During this segment of the conveyor motion, the logs in the lanes of the conveyor are free to move. This segment of the conveyor motion is typically used to advance the tissue log to a position corresponding to the desired length of the cut-off segment of the tissue log. The indexing or make-up distance is typically the distance that the log has to move before the next cut cycle occurs to achieve the desired cut-off length of the roll.

In the embodiment of the controller, for instance, as shown schematically in FIG. 7 (e.g., when controller controls the drive to move the log advancement members of all the conveyor lanes simultaneously), the blade cutting segment is represented by the portion of the cut cycle when the leading edge of the blade first enters lane 1 and ends when the trailing edge of the blade exits lane 4. The blade out-of-log segment starts when the blade finishes the cut on the log of lane 4 and ends when the leading edge of the blade enters lane 1. The two segments together represent one cut cycle.

To increase throughput, the controller may be enabled to control each drive to move the log advancement member of one lane independently of the log advancement member of another lane. As shown schematically in FIG. 8, each lane has its own blade in-log segment and blade out-of-log segment. For example, lane 1's blade cutting segment is represented by the portion of the cut cycle when the leading edge of the blade first enters lane 1 and ends when the blade finishes the cut on the log of lane 1. The blade out-of-log segment for lane 1 is represented by the portion of the cut cycle when the blade finishes the cut on the log of lane 1 and ends when the leading edge of the blade reenters lane 1. The pattern is the same for each lane. Thus, the blade out-of-log segment for lane 2 is represented by the portion of the cut cycle when the blade finishes the cut on the log of lane 2 and ends when the leading edge of the blade reenters lane 2.

By allowing each lane 26 to move independent of one another, each lane has a separate blade cutting segment and blade out-of-log segment. As shown by comparison of FIGS. 7 and 8, the FIG. 8 blade cutting segment represents a much smaller portion of the cut cycle compared to the FIG. 7 blade in-log segment. Likewise, the FIG. 8 blade out-of-log segment represents a much greater portion of the cut cycle compared to the FIG. 7 blade out-of-log segment. By making the blade cutting segment a smaller portion of the cut cycle and the blade out-of-log segment a larger portion of the cut cycle on a per lane basis, the conveyor dynamics of each lane may be improved. For instance, in a scheme of lane control as shown schematically in FIG. 7, indexing motion for all four lanes of the conveyor has to occur faster during the relatively small portion of the blade—out-of-log segment of the cycle. This tends to create more aggressive conveyor motion, which can be undesirable. In a scheme of lane control as shown schematically in FIG. 8, the blade out-of-log segment for a lane is a relatively large portion of the cut cycle. Thus, the indexing motion for the lane may occur over a larger portion of the cut cycle. Consequently, the conveyor motion and lane motion may be relatively less aggressive. This may be advantageous depending upon the nature of the tissue log material. The saw cycle time may also be decreased (or throughput increased).

In the control scheme shown schematically in FIG. 8, each lane will have a different blade out-of-log segment and consequently, the cut-off segments of the tissue log will be discharged from the saw with a slight stagger. For example, lane 1 will precede lane 2, which will precede lane 3 and so on.

Additionally, the controller 70 may be enabled to independently control the two drives 42',42" associated with each lane 26, thus allowing time for the accumulator 29 to deposit a tissue log in the lane and a second log advancement member to move to the starting position and then advance the deposited tissue log immediately behind the first log advancement member advancing an in-process tissue log through the saw. This allows for an increase in throughput by eliminating space between successive tissue logs to be cut. It also better synchronizes timing with the accumulator 29 depositing a tissue log 22 in a lane 26, and the log advancement member 40 being in the starting position. Thus, the controller 70 may be enabled to control the drives such that the distance between successive log advancement members may be changed as needed, for instance, to be increased to allow deposit of the tissue log from the accumulator, and to be decreased to eliminate any spacing between successive tissue logs in the lane. In other words, the controller may be enabled to control the drive to move the log advancement member so that the in-process flight or lead tissue log can move independently from the flight that is ready to accept a new log from the accumulator. With this, the timing of the log deposit from the accumulator to the lane may be more flexible. While the controller is controlling the drive to move the log advancement member such that the in-process flight conveys a log through the saw to be cut, the controller is controlling the other drive to maintain the other log advancement member stationary so that the next flight can dwell waiting for the next log in the accumulator. Once the log is received from the accumulator, the controller may be enabled to control the drive to move the log advancement member such that the front end of the log can be advanced to a position immediately behind the in-process log, thus eliminating spacing and otherwise unnecessary indexing and possible air cuts by the orbital saw.

Figure 9:
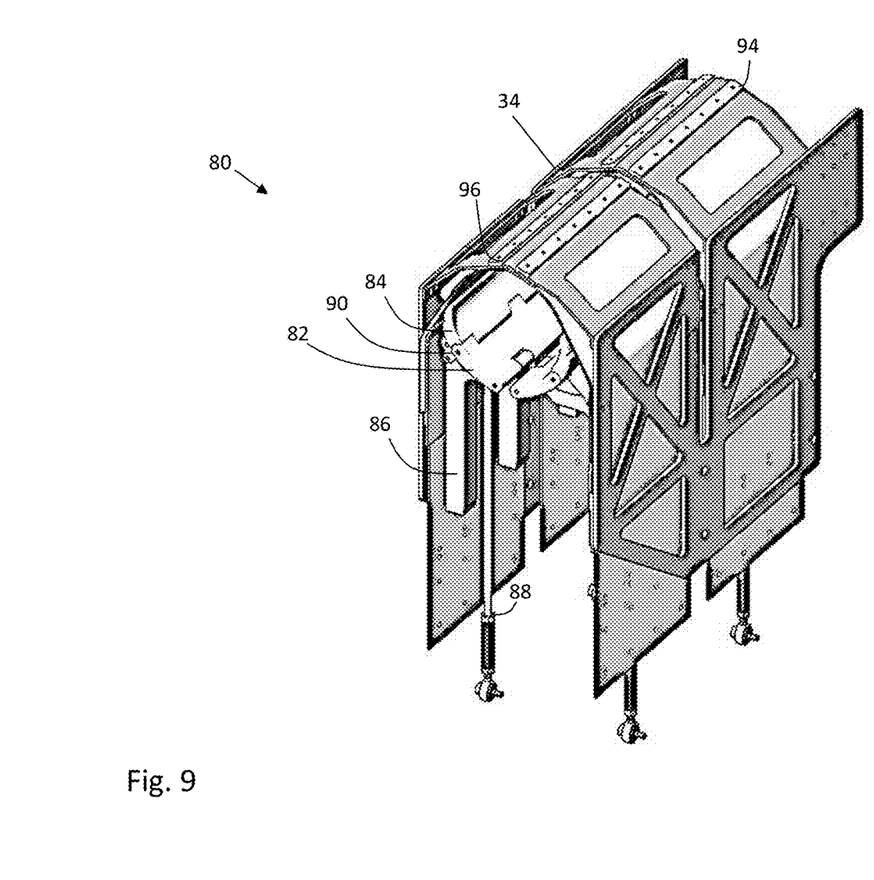
FIG. 9 is a perspective view of an exemplary peripheral constraint.
Figure 10:
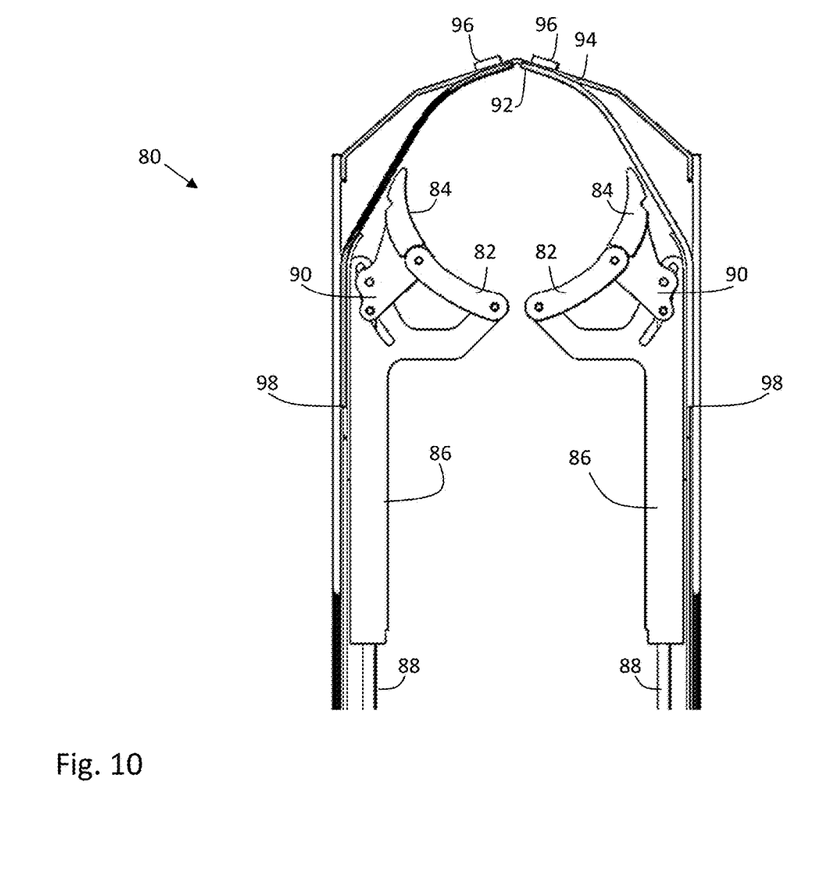
FIG. 10 is an end view of the peripheral constraint of FIG. 9.

One or more of the lanes may also be provided with a peripheral constraint 80, for instance, as shown in FIGS. 9 and 10. The peripheral constraint 80 may engage the tissue log outer circumference or cylindrical surface area to help secure the tissue log 22 during cutting by the saw 24. In addition, the peripheral constraint 80 may provide contact friction with the tissue log outer circumference or cylindrical surface thereby providing drag force on the tissue log to counter the force of acceleration and deceleration during the log indexing motion. The drag force assists with control of the tissue log advancement and provides accurate log advancement for each index or incremental advance. The peripheral log constraint may also be in accordance with U.S. Pat. No. 6,532,851 (the "'851 patent"), the disclosure of which is incorporated by reference, or a similar tissue log support and drag apparatus.

In the embodiment of peripheral log constraint as shown in FIGS. 9 and 10, right and left bottom support links 82 and right and left side support links 84 may be mounted to a lower support frame 86. A push/pull rod 88 that is connected to a linkage 90 may be used to move the lower and side support links 82,84 as needed to accommodate varying product diameters. A flexible member 92 that conforms to the shape and size of the tissue log may be provided at the upper portion of the peripheral log constraint. The flexible member 92 may engage generally the top of the tissue log 22 in the lane 26. The flexible member 92, for example, could be a thin, flexible sheet of plastic or rubber. The flexible member 92 may be attached to an upper frame member 94, and the upper frame member may move up and down as needed to account for product of varying diameter. A top portion 96 and a bottom portion 98 of the flexible member 92 may be attached to the upper frame member 94 at different locations. The top portion 96 of the flexible member and the bottom portion 98 of the flexible member may be configured to move up and down at different rates, which in turn allows for the flexible member 92 to conform to the top outer surface of the tissue log for a wide range of product diameters.

Further embodiments can be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed is:

1. A conveyor system for advancing tissue logs, the conveyor system comprising:

a lane having a receiving end and an opposite discharge end and a length extending between the receiving end and the discharge end, the lane being configured to receive a tissue log at the receiving end of the lane, the lane being configured to discharge a tissue log from the lane at the discharge end of the lane;

a first log advancement member for the lane, the first log advancement member being adapted and configured to engage a lead tissue log received in the lane at the receiving end of the lane and convey the lead tissue log toward the discharge end of the lane, the first log advancement member being movable between a start position and a finish position, wherein in the start position, the first log advancement member is positioned in the lane so as to allow the lead tissue log to be received in the lane at the receiving end of the lane, and wherein in the finish position, the first log advancement member is positioned in the lane so as to advance the lead tissue log to the discharge end of the lane;

a first drive for the first log advancement member of the lane, the first drive being adapted and configured to move the first log advancement member between the start position and the finish position;

a second log advancement member for the lane, the second log advancement member being adapted and configured to engage a successive tissue log received in the lane at the receiving end of the lane after the lead tissue log and convey the successive tissue log toward the discharge end of the lane, the second advancement member being movable between the start position and the finish position, wherein in the start position, the second log advancement member is positioned in the lane so as to allow the successive tissue log to be received in the lane adjacent the receiving end of the lane, and wherein in the finish position, the second log advancement member is positioned in the lane so as to advance the successive tissue log to the discharge end of the lane;

a second drive for the second log advancement member of the lane, the second drive being adapted and configured to move the second log advancement member between the start position and the finish positions; and a controller coupled to the first drive and the second drive, the controller being adapted and configured to control the first drive to move the first log advancement member between the start position and the finish position, the controller being adapted and configured to control the second drive to move the second log advancement member between the start position and the finish position, the controller being adapted and configured to control the first drive independently of the second drive.

2. The conveyor of claim 1 wherein the controller is adapted and configured to control the second drive of the lane to advance the second log advancement member of the lane toward the finish position before the first log advancement member of the lane arrives at the finish position.

3. The conveyor of claim 1 wherein the controller is adapted and configured to control the first drive of the lane to maintain the first log advancement member of the lane at the finish position to engage the successive tissue log and to advance the first log advancement member of the lane to the start position after engaging the successive tissue log.

4. The conveyor system of claim 1 further comprising a log saw having a blade, the log saw blade being positionable adjacent to the discharge end of the lane and configured to cut a log in the lane.

5. A conveyor system for advancing tissue logs comprising:
- a plurality of lanes, each lane having a length extending between a receiving end and a opposite discharge end of the lane, the receiving end being configured to receive a log in the lane, the discharge end being configured to expose tissue logs in the lane to a blade of a log saw;
- a first log advancement member for each lane, the first log advancement member being adapted and configured to engage a lead tissue log received in the lane at the receiving end of the lane and convey the lead tissue log toward the discharge end of the lane, the first log advancement member being movable between a start position and a finish position, wherein in the start position, the first log advancement member is positioned in the lane so as to allow the lead tissue log to be received in the lane at the receiving end of the lane, and wherein in the finish position, the first log advancement member is positioned in the lane so as to advance the lead tissue log to the discharge end of the lane;
- a first drive for the first log advancement member of each lane, the first drive being adapted and configured to move the first log advancement member between the start and finish positions;
- a second log advancement member for each lane, the second log advancement member being adapted and configured to engage a successive tissue log received in the lane at the receiving end of the lane after the lead tissue log and convey the successive tissue log toward the discharge end of the lane, the second advancement member being movable between the start position and the finish position, wherein in the start position, the second log advancement member is positioned in the lane so as to allow the successive tissue log to be received in the lane at the receiving end of the lane, and wherein in the finish position, the second log advancement member is positioned in the lane so as to advance the successive tissue log to the discharge end of the lane;
- a second drive for the second log advancement member of each lane, the second drive being adapted and configured to move the second log advancement member between the start position and the finish positions; and
- a controller coupled to the first drive and the second drive of each lane, the controller being adapted and configured to control the first drive of each lane to move the first log advancement member of each lane between the starting and finish positions, the controller being adapted and configured to control the second drive of each lane to move the second log advancement member of each lane between the starting and finish positions, the controller being adapted and configured to control the first drive of each lane independently of the second drive of each lane, the controller being adapted and configured to control the first and second drive of one lane independently of the first and second drive of another lane.

6. The conveyor of claim 5 wherein the controller is adapted and configured to control the second drive of each lane to advance the second log advancement member of the lane toward the finish position before the first log advancement member of the lane arrives at the finish position.

7. The conveyor of claim 5 wherein the controller is adapted and configured to control the first drive of each lane to maintain the first log advancement member of the lane at the finish position to engage the successive tissue log and to advance the first log advancement member of each lane to the start position after engaging the successive tissue log.

8. The conveyor of claim 5 wherein the first log advancement member of each lane is operatively connected to a first continuous loop, and the second log advancement member of each lane is operatively connected to a second continuous loop.

9. The conveyor of claim 8 further comprising a wheel for moving each of the continuous loops of the lane, the wheel being operatively connected to the drive associated with the log advancement member of the lane.

10. The conveyor of claim 9 further comprising a rail extending along each lane upon which the first and second log advancement members travel while moving from the start position to the finish position.

11. The conveyor of claim 10 wherein the rail of the lane is disposed between the first and second continuous loops of the lane.

12. The conveyor of claim 5 wherein the controller is adapted and configured to control the first drives of each lane to synchronize movement of the first log advancement members of the lanes between the starting and finish positions, the controller is adapted and configured to control the second drives of each lane to synchronize movement of the second log advancement members of the lanes between the starting and finish positions, with the movement of the first log advancement members of the lanes being independent of the movement of the second log advancement members of the lanes.

13. The conveyor of claim 5 further comprising a log saw having a blade, the log saw blade being positionable adjacent to the discharge end of each lane to cut a log in each lane.

14. A conveyor system for advancing tissue logs comprising:
- a conveyor comprising:
  - a plurality of lanes with first and second lanes of the plurality of lanes laterally adjacent to each other, each lane having a length extending between a receiving end and a opposite discharge end of the lane, each lane being configured to receive tissue logs;
  - a log advancement member for each lane, each log advancement member being adapted and configured to engage the tissue log received in the lane at the receiving end of the lane and convey the tissue log toward the discharge end of the lane, each log advancement member being movable in the lane between a start position and a finish position, wherein in the start position the log advancement member is positioned in the lane in a manner to allow the tissue log to be received in the lane at the receiving end of the lane, and wherein in the finish position, the log advancement member is positioned in the lane in a manner to advance the tissue log to the discharge end of the lane;
  - a drive for the log advancement member of each lane, the drive being adapted and configured to move the log advancement member between the start and the finish positions;
  - a controller coupled to the drive of the log advancement member of each lane, the controller being adapted and configured to control the drive to move the log advancement member of each lane between the start position and the finish position, the controller being adapted and configured to control the drive of one lane independently of the drive another lane, the controller being adapted and configured to control the drive of the log advancement member of each lane to intermittently stop and start as the log advancement member of each lane moves from the start position to the finish position; and a log saw having a blade positionable adjacent the discharge end of each lane;

wherein the controller is adapted and configured to control the drive of the log advancement member of the first lane to stop advancement of the log advancement member of the first lane toward the finish position when the log saw moves the blade into the first lane and to restart advancement of the log advancement member of the first lane toward the finish position when the blade completes cutting of a tissue log in the first lane; and wherein the controller is adapted and configured to control the drive of the log advancement member of the second lane to stop advancement of the log advancement member of the second lane toward the finish position when the log saw moves the blade into the second lane and to start advancement of the log advancement member of the second lane toward the finish position when the blade completes cutting of a tissue log the second lane.

15. The conveyor system of claim 14 further comprising:
at least one other log advancement member for each of the lanes, the at least one other log advancement member being adapted and configured to engage a successive tissue log at the receiving end of the lane and convey the successive tissue log toward the discharge end of the lane, the at least one other log advancement member being movable between the start position and the finish position, wherein in the start position the at least one other log advancement member is positioned in the lane in a manner to allow the successive tissue log to be received in the lane at the receiving end of the lane, and wherein in the finish position, the at least one other log advancement member is positioned in the lane in a manner to advance the successive tissue log past the discharge end of the lane; and at one other drive for the at least one other log advancement member of each lane, the at least one other drive being adapted and configured to move the at least one other log advancement member between the start position and the finish position;

wherein the controller is coupled to the at least one other drive of the at least one other log advancement member, the controller is adapted and configured to control the at least one other drive to move the at least one other log advancement member between the start position and the finish position, the controller is adapted and configured to control the drive of the log advancement member independently of the at least one other drive of the at least one other log advancement member.

16. The conveyor of claim 15 wherein the controller is adapted and configured to control the at least one other drive of each lane to advance the at least one other log advancement member of the lane toward the finish position before the log advancement member of the lane arrives at the finish position.

17. The conveyor of claim 15 wherein the controller is adapted and configured to control the drive of the lane to maintain the log advancement member of the lane at the finish position to engage the successive tissue log and to advance the log advancement member of the lane to the start position after engaging the successive tissue log.

18. The log saw of claim 15, wherein the controller is adapted and configured to control the at least one other drive of each lane to stop advancement of the respective log advancement members toward the finish position when the saw moves the blade into the respective lane and to restart advancement of the respective log advancement members toward the finish position when the blade completes cutting of the log in the respective lane.

19. The log saw of claim 14, wherein the saw is configured and adapted for orbital motion relative to the lanes of the conveyor.

\* \* \* \* \*

UNITED STATES PATENT AND TRADEMARK OFFICE
CERTIFICATE OF CORRECTION

PATENT NO. : 10,272,585 B1  
APPLICATION NO. : 15/919424  
DATED : April 30, 2019  
INVENTOR(S) : Matthew J. Chike and Cory P. Gussert Page 1 of 1

It is certified that error appears in the above-identified patent and that said Letters Patent is hereby corrected as shown below:

In the Claims

Column 12, Line 1, after "at" (first occurrence), insert --least--.

Signed and Sealed this  
Fourth Day of November, 2025

John A. Squires  
*Director of the United States Patent and Trademark Office*